United States Patent [19]

Aviram

[11] Patent Number: 4,538,252
[45] Date of Patent: Aug. 27, 1985

[54] LIGHT INDUCED CAPACITANCE CHANGES IN DONOR POLYMERS (OR SMALL MOLECULES) FILMS AND ITS USE FOR INFORMATION STORAGE IN VIDEO DISKS AND THE LIKE

[75] Inventor: Ari Aviram, Yorktown Heights, N.Y.
[73] Assignee: International Business Machines Corporation, Armonk, N.Y.
[21] Appl. No.: 295,210
[22] Filed: Aug. 24, 1981
[51] Int. Cl.³ .................... G11B 11/00; G11B 11/12
[52] U.S. Cl. ................... 369/13; 369/126; 369/276; 430/270; 430/337
[58] Field of Search ............. 369/13, 276, 126; 430/270, 332, 337, 311, 321, 336, 339, 340, 344; 428/64, 65

[56] References Cited

U.S. PATENT DOCUMENTS

| | | | |
|---|---|---|---|
| 4,187,105 | 2/1980 | Wainer et al. | 430/337 X |
| 4,306,013 | 12/1981 | Roach et al. | 369/126 X |
| 4,312,935 | 1/1982 | Engler et al. | 430/270 X |
| 4,316,279 | 2/1982 | Russell et al. | 369/13 X |
| 4,360,583 | 11/1982 | Engler et al. | 430/270 |

FOREIGN PATENT DOCUMENTS 141618  11/1979  Japan .................. 369/13

OTHER PUBLICATIONS

Optical Engineering, "Review and Analysis of Optical Recording Media", vol. 15, No. 2, pp. 99–108, 1976.
RCA Review Video Disc, vol. 39, No. 1, Mar. 1979, pp. 7–13.

Primary Examiner—Robert L. Richardson
Attorney, Agent, or Firm—Joseph G. Walsh

[57] ABSTRACT

A method for capacitatively storing data on a grooveless storage device is provided. The storage device is comprised of a conductive substrate having a layer of a photosensitive composition which dielectric constant is varied in the presence of irradiation. The method is carried out by exposing a layer of a photosensitive composition to irradiation in a predetermined pattern. The exposed layer is fixed by heating. Video disks for recording and playing back video signals can be prepared in accordance with the present method.

8 Claims, 2 Drawing Figures

LIGHT INDUCED CAPACITANCE CHANGES IN DONOR POLYMERS (OR SMALL MOLECULES) FILMS AND ITS USE FOR INFORMATION STORAGE IN VIDEO DISKS AND THE LIKE

DESCRIPTION

1. Field of the Invention

This invention relates to video storage disks and the method of preparing the same.

2. Prior Art

Present day video storage disks are used to receive optically transmitted information which can be stored in thin film layers of radiation or thermal sensitive materials. The stored information can be read by optical techniques.

Typically, these disks are comprised of a substrate having disposed thereon radiation sensitive materials such as chalcogenide glasses or polymeric films having dyes embedded therein (for a comprehensive review of optical storage media see R. A. Bartolini et al, "Review and Analysis of Optical Recording Media", Optical Engineering, Vol. 15, No. 2, pages 99–108, 1976). In these disks the absorption of actinic radiation causes a hole or crevice to be formed in the irradiated region. These deformations are optically read. Other materials employed in video disks undergo photochromism when exposed to actinic radiation. For example, azo-based dyes in a polymer matrix are coated on a substrate. When exposed to actinic radiation these dyes undergo absorption spectrum changes which can be fixed chemically to provide optically patterned information.

Recently it has been discovered that modified tetraheterofulvalene derivatives could be used to optically store data which is optically detectable. It was found that through the use of these materials high resolution is obtainable. (See application Ser. No. 216,341, now U.S. Pat. No. 4,360,583 having a common assignee).

More recently, information storage devices have been devised wherein signal-retrieval is accomplished by reading changes in capacity along a recording track. Capacitative changes are discerned by changes in the depth of the grooves or tracks in the recording surface. The process for making these storage devices depends on the production of a master and duplicating it by compounding and pressing, akin to the process of preparing phonorecords. This process is not conducive for recording video information in the home or office environment. Please see RCA Review Video Disc, Vol. 39, No. 1, March 1979, page 7 et seq.

What has been discovered here is that a grooveless video storage device can be prepared by coating a substrate with a layer of a donor molecule composition which undergo changes in its dielectric constant when irradiated. Information which is stored thereon can be read capacitatively.

SUMMARY OF THE INVENTION

The invention relates to a novel method of preparing video information storage devices and to a video storage device prepared thereby.

BRIEF DESCRIPTION OF THE DRAWINGS

Referring to FIG. 1, there is shown the steps necessary to record information on a storage device contemplated by this invention. The information source can be a video camera, video transmission (from a station) AM or FM sound signals, binary output from computers, signal trains (binary or analog) from any other source including printers, typewriters etc.

Information from any of the aforementioned sources is then signal encoded by use of data or image compression techniques known to workers in the art such as: linear predictive encoding; relative address encoding; differential pulse code modulation, etc. The encoded signals are then used to amplitudinally modulate a light source such as high pressure mercury lamp, a laser or light emitting diodes at a wavelength suitable to effect a photochemical reaction in a layer of a donor molecule composition. A method for modulating light from one of the above sources is by using a vibrating mirror that deflects the light beam so that it passes through a slit and to the disk or away from the slit according to the information to be recorded. Modulation is accomplished by conventional means. A number of conventional modulating schemes can be used to address light pulses to said layer of donor molecule composition. For example, modulated laser beams can be deflected onto a rotating disk having the photochemical reactionable composition. The deflection is effected to obtain higher and higher orbits on the rotating disks. Alternatively light pulses can be inserted into a fiber-optic that terminates as a stylus. The stylus is mechanically caused to travel in the plane of the rotating disk thereby recording an image. In another option, blanket light exposure of the storage disk through a mask can be used for duplication of masters.

After exposure the imposed images is then fixed by heating at 160° C. for about 2 mins., at 100° C. for about 10 mins., or 80° C. for about 20 mins. Just prior to reading the recorded information the disk can be lubricated with a silcone oil such as polymethylsiloxane.

Figure 1:
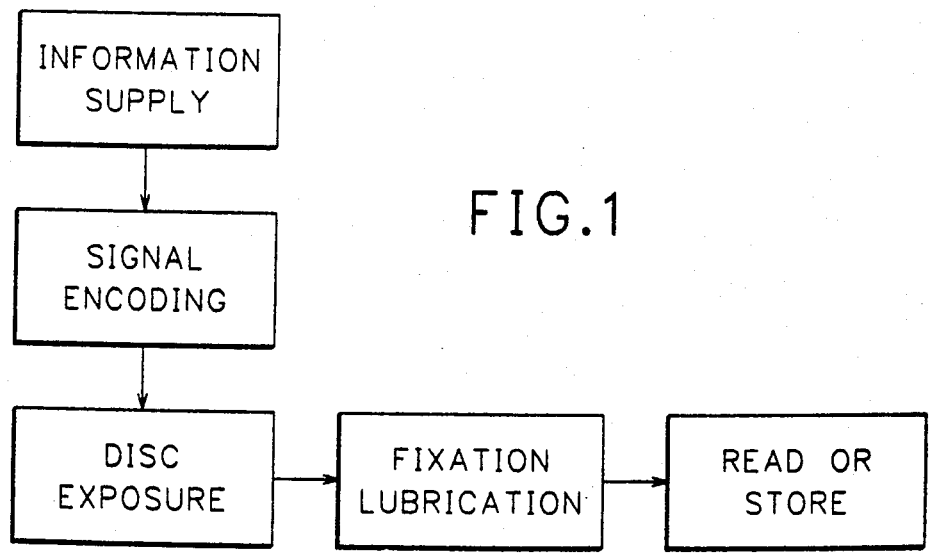
FIG. 1 is a block diagram of the steps necessary to record video information on a storage device.
Figure 2:
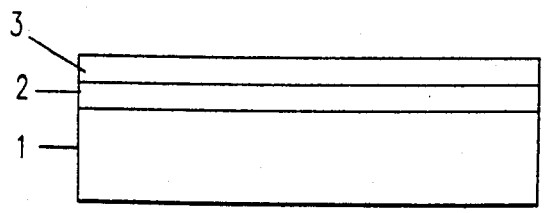
FIG. 2 is a schematic drawing of a storage device used in the present invention.

In FIG. 2 there is shown a storage device or disk contemplated for use in the present invention. It is comprised of a substrate 1. Substrate 1 can be composed of a metallic sheet such as stainless steel, copper, aluminum and the like. The thickness of substrate 1 can vary from about 1 mil thick to about $\frac{1}{8}$ of an inch thick. Optional materials which can be used are electrically conductive plastic compositions. For example, graphite filled plastics such as polycarbonate, polyurethane, polyvinyl, polymethylmethacrylate and the like can be used. The ratio of polymer to graphite in the composition can be about 70 parts to 30 parts ±10%. The thickness of the substrate when these materials are used is from about 1 mm to about 5 mm.

A conductive layer 2 is disposed upon substrate 1, if said substrate is prepared from a material other than a metal. For example, if substrate 1 is composed of a graphite filled polymer then a layer of a metal selected from Al, Cu, Ag, Au, Ni, Cr, Ti and the like is used. The thickness of layer 2 is about 1000 Å thick ±500 Å.

Disposed on layer 2 or substrate 1 depending on the composition of substrate 1, is a dielectric layer 3. Layer 3 is a photosensitive composition which changes its dielectric constant when irradiated. The preferred thickness of layer 3 is about 0.5μ to about 3μ.

Layer 3 is composed of polymeric active components. The photochemical component can be chemically bonded to it as for example, polystyrenetetrathiafulvalene, or poly[p-(N,N-dimethylamino)]N-α-D- glutamanilide. Alternatively, it can be a polymer binder which incorporates small molecules of donors and acceptors dispersed within its space. At least one component usually the acceptor, is in dispersed form.

Polymer binders contemplated for use in the present invention include polycarbonate, polystyrene, polyglutamic acid, polyacryloyl chloride, polyacrylate, poly($\alpha$halophosphazenes), polyvinylbenzyl chloride, polyesters, polyurethanes, polyvinylchloride, polyvinyls, polyepichlorohydrin and the like.

Suitable dispersable donor molecules include fulvalene compositions such as tetrathiafulvalene and its derivatives such as 2-methyl tetrathiafulvalene
2,3-dimethyl tetrathiafulvalene
2,6-dimethyl tetrathiafulvalene
2,3,6,7-tetramethyl tetrathiafulvalene
2-ethyl tetrathiafulvalene
2,3-diethyl tetrathiafulvalene
2,6-diethyl tetrathiafulvalene
2,3,6,7-tetraethyl tetrathiafulvalene
2-methoxy tetrathiafulvalene
2,3-dimethoxy tetrathiafulvalene
2,6-dimethoxy tetrathiafulvalene
2,3,6,7-tetramethoxy tetrathiafulvalene
2-carbomethoxy tetrathiafulvalene
2-carboxy tetrathiafulvalene
2-phenyl tetrathiafulvalene
2,3-diphenyl tetrathiafulvalene
2,6-diphenyl tetrathiafulvalene
2,3,6,7-tetraphenyl tetrathiafulvalene
2-(4-hydroxyphenyl)tetrathiafulvalene
2-(4-methylphenyl)tetrathiafulvalene
2-(4-aminophenyl)tetrathiafulvalene
2-(4-mercaptophenyl)tetrathiafulvalene
phenylenediamine
N,N'-tetramethylphenylenediamine
2,6-naphthalenediamine
N,N'-tetramethyl-2,6-naphthalenediamine
Leuco dyes and their derivatives
1,1-Bis(4-dimethylaminophenyl)-ethylene
1,2-Bis(4-dimethylaminophenyl)-ethylene
2-(4-dimethylaminostyryl)benzothiazole
4-(4-dimethylaminostyryl)quinoline
2-(4-dimethylaminostyryl)quinoline
leuco methyleneblue acetamide
hexaaryldimidazole Amines having the formula R—NH$_2$ where R can be an alkyl and an aryl group, i.e., pyrazolines, tetrathiatetracene, ferrocene and phenothiazine.

As indicated above, these donor compositions can be bonded to the above-mentioned polymer binders
poly leucomethyleneblue acrylamide
poly-4-[(4-methyleneoxyphenyl)-2-tetrathiafulvalene]
styrene
(polystyrene-TTF)
poly[p-(N,N-dimethylamino)-N-$\alpha$-D-glutamanilide]
poly[p-(N,N-dimethylamino)-N-acrylanilide]
polyvinylferrocene
polyvinylcarbazole In conjunction with the polymer bonded donor compositions or with the polymer binder, donor molecule compositions there is included an acceptor molecule. This acceptor molecule can form a charge transfer salt with the polymer bonded donor molecule composition or can simply be encompassed in the dispersed phase of the polymer-binder donor molecule composition. Acceptor molecules found suitable for the purposes of the invention include 1,2,dibromtetrachloroethane, carbon tetrabromide, iodoform p-toluene sulfonyl chloride and 1 naphthalene sulfonyl chloride, 2 naphthalene sulfonyl chloride and 3 naphthalene sulfonyl chloride.

In the preparation of the photosensitive film a solution of the selected polymer-donor composition is prepared by dissolving the composition in a suitable solvent. The solvent should dissolve all the components. In the case of polystyrene-TTF, THF is a suitable solvent. A solution of about 10% by weight of polymer-donor compositions is preferred. The solution is prepared in a darkroom. The concentration of this solution is important for coating purposes and will depend on the coating equipment. Solutions from 10%–75% concentration have been used. To this solution is added a desired acceptor molecule. This acceptor molecule is added in a preferred range of about 10% to about 30% by weight of the polymer-donor composition. The prepared solution is then coated onto the metal surface of the substrate. The coated film has a preferred thickness in the range of about $\frac{1}{2}\mu$ to about $3\mu$. The adherence of the film can be enhanced by the application of an adhesion promoter such as octadecyltriethoxysilane and 3-aminopropyltriethoxysilane.

Where halocarbon acceptors are incorporated in the film, the film after recording thereon, can be fixed by simply heating the coated substrate. Heating is performed at about 80° C. for about 20 minutes, or 150° C. for about 2 mins. or 100° at about 10 mins., in the presence of activated charcoal. Where sulfonyl chloride acceptors are used, the record can be fixed by placing the coated substrate in an ammonia atmosphere. The coated substrate is placed in an ammonia containing chamber for about 20 minutes. The length of time the coated substrate remains in the chamber depends on the diffusion permeability of ammonia in the polymer binder. It is found that the time is in the range of about 5–20 minutes.

An alternate method of fixing the recorded image is to coat it with an ethanolic solution of ammonia. Of course one skilled in the art would know not to use this procedure where the polymer is soluble in alcohol.

The following example is given by way of illustration only. It should not be construed as a limiting example. All of the above-mentioned compositions can equally be used with very similar results.

EXAMPLE

A 10% solution of polystyrene tetrathiafulvalene (weight of polymer) in THF is prepared in a darkroom to which 20% (by weight of polymer) of dibromotetrachloroethane is added. The solution is then spin coated onto the metallic surface of an aluminized substrate. The substrate is a 3% graphite filled polycarbonate, 1/16 inch thick. The film is recorded on by a beam of light of wavelength between 3000 Å and 3800 Å focused onto the track of the disc in spots of $1\mu$ or less diameter. The light source can be a laser such as helium-cadmium laser or a UV lamp such as high pressure mercury or a xenon lamp. The addressing modulated light is positioned along the track of the rotating disk by silica fiber wave guides which are mechanically moved to follow the spiral track of the disk.

After recording, the substrate is placed in a heated chamber having activated charcoal therein. It is heated at a temperature of about 80° C. for about 20 minutes. The recorded image can now be stored or it can be read on a commercially available device such as a RCA vista vision unit.

Having thus described my invention, what I claim as new, and desire to secure by letters patent is:

1. A method for capacitively storing data on a grooveless storage device including the steps of
    (a) providing a storage device comprised of a conductive substrate having coated thereon a grooveless layer of a donor molecule composition which changes its dielectric constant when irradiated;
    (b) projecting data in the form of light in a predetermined pattern onto the surface of said grooveless layer of donor molecule composition to effect changes in the dielectric constant in said layer in said predetermined pattern; and
    (c) heating said exposed storage device to fix said predetermined pattern thereon.

2. A method according to claim 1 wherein said donor molecule composition is selected from donor-acceptor polymer charge transfer complexes being composed having a polymer backbone, a donor molecule and an acceptor in the proximity of said donor molecule.

3. A method according to claim 2 wherein said polymer backbone is selected from the group consisting of polyglutamic acid, polyvinyl chloride, polyesters, polyurethane, polyepichlorohydrin, poly($\alpha$halophosphazenes), polyacryate, polyacryloyl chloride, polystyrene, polycarbonate and polyvinylbenzylchloride, said donor molecule is selected from the group consisting of tetrathiafulvalenes and its derivatives, dithiadiselenafulvalene and its derivatives, amines having the formula R—$NH_2$ where R can be an alkyl and an aryl group, pyrazolines, tetrathiatetracene, ferrocene and phenothiazine, leuco dyes and their derivatives and said acceptor molecule is selected from the group consisting of $CCl_4$, $CBr_4$, $C_2H_2Cl_4$, $C_2Cl_2Br_4$, $C_3Br_4H_4$, $CBr_2Cl_4$, $CHBr_3$, $CHI_3$, p-toluene sulfonyl chloride, 1 naphathalene sulfonyl chloride, 2 naphathalene sulfonyl chloride and 3 naphthalene sulfonyl chloride.

4. A method according to claim 3 wherein said backbone is a polymer binder having said acceptor and said donor molecule dispersed therein.

5. A method according to claim 4 wherein said disperse donor molecules is selected from the group consisting of
2-methyl tetrathiafulvalene
2,3-dimethyl tetrathiafulvalene
2,6-dimethyl tetrathiafulvalene
2,3,6,7-tetramethyl tetrathiafulvalene
2-ethyl tetrathiafulvalene
2,3-diethyl tetrathiafulvalene
2,6-diethyl tetrathiafulvalene
2,3,6,7-tetraethyl tetrathiafulvalene
2-methoxy tetrathiafulvalene
2,3-dimethoxy tetrathiafulvalene
2,6-dimethoxy tetrathiafulvalene
2,3,6,7-tetramethoxy tetrathiafulvalene
2-carbomethoxy tetrathiafulvalene
2-carboxy tetrathiafulvalene
2-phenyl tetrathiafulvalene
2,3-diphenyl tetrathiafulvalene
2,6-diphenyl tetrathiafulvalene
2,3,6,7-tetraphenyl tetrathiafulvalene
2-(4-hydroxyphenyl)tetrathiafulvalene
2-(4-methylphenyl)tetrathiafulvalene
2-(4-aminophenyl)tetrathiafulvalene
2-(4-mercaptophenyl)tetrathiafulvalene
phenylenediamine
N,N'-tetramethylphenylenediamine
2,6-naphthalenediamine
N,N'-2,6-naphthalenediamine
Leuco dyes and their derivatives
1,1-Bis(4-dimethylaminophenyl)-ethylene
1,2-Bis(4-dimethylaminophenyl)-ethylene
2-(4-dimethylaminostyryl)benzothiazole
4-(4-dimethylaminostyryl)quinoline
2-(4-dimethylaminostyryl)quinoline
leuco methyleneblue acetamide
hexaaryldimidazole
amines having the formula R—$NH_2$ where R can be an alkyl and an aryl group, i.e., pyrazolines, tetrathiatetracene, ferrocene and phenothiazine.

6. A method according to claim 2 wherein said donor acceptor polymer charge transfer complex consist of a polymer backbone having a donor molecule bonded thereto.

7. A method according to claim 2 wherein acceptor molecules include $CCl_4$, $CBr_4$, $H_2C_2CL_4$, $C_2Cl_2Br_4$, $C_3Br_4H_4$, $CBr_2Cl_4$, $CHBr_3$, $CHI_3$, p-toluene sulfonyl chloride, 1 napthalene sulfonyl chloride and 3 naphthalene sulfonyl chloride.

8. A method according to claim 7 wherein said polymer having a donor molecule bonded thereto include polystyrnetetrathiafulvalene, or poly[p-N,N-dimethylamino)]N-$\alpha$-D-glutamanilide.

* * * * *